United States Patent [19]

LaVoe

[11] 4,331,312

[45] May 25, 1982

[54] INSTRUMENT MOUNTING RACK

[76] Inventor: Paul A. LaVoe, 4114 W. Burbank Blvd., Apt. B, Burbank, Calif. 91505

[21] Appl. No.: 106,549

[22] Filed: Dec. 26, 1979

[51] Int. Cl.3 ........................ F16M 11/00; G10C 3/12

[52] U.S. Cl. ...................................... 248/201; 84/177; 84/446; 248/165

[58] Field of Search ................. 84/177, 242, 424, 425, 84/446; 248/165, 157, 172, 188.1, 226.1, 287, 300, 551, 553, 201

[56] References Cited

U.S. PATENT DOCUMENTS

| | | | |
|---|---|---|---|
| 64,371 | 4/1867 | Roz | 84/424 |
| 970,342 | 9/1910 | Kurt | 248/165 |
| 1,072,550 | 9/1913 | Wilson | 248/165 X |
| 1,239,609 | 9/1917 | Little | 84/425 |
| 1,532,688 | 4/1925 | Feueustein | 248/229 |
| 1,657,169 | 1/1928 | Mayhew | 84/425 |
| 2,550,793 | 5/1951 | Ferriera | 248/165 X |
| 2,783,367 | 2/1957 | Locke | 248/287 X |
| 2,805,776 | 9/1957 | Levitin | 248/172 X |
| 3,111,056 | 11/1963 | Weigl | 84/425 |
| 4,138,019 | 2/1979 | Smith | 248/226.1 X |

FOREIGN PATENT DOCUMENTS

| | | | |
|---|---|---|---|
| 184223 | of 1936 | Switzerland | 248/165 |
| 740911 | of 1955 | United Kingdom | 248/157 |

*Primary Examiner*—James A. Leppink

*Assistant Examiner*—George A. Suchfield

*Attorney, Agent, or Firm*—Roger A. Marrs

[57] ABSTRACT

A mounting rack is disclosed herein for holding an instrument, an amplifier, a music rack or other equipment related to a piano onto the top of and immediately above the piano within reach of the player. The rack includes a pair of equipment support pieces having detachable and adjustable leg portions or stand-offs engageable with ledges or shoulders formed in the top portion of a piano. Elongated slots are provided on one end of each support member and on one leg portion so that adjustments can be made for tilt and overhang of the mounted equipment. Fasteners are employed for releasably securing the leg portions with opposite ends of each support member.

3 Claims, 3 Drawing Figures

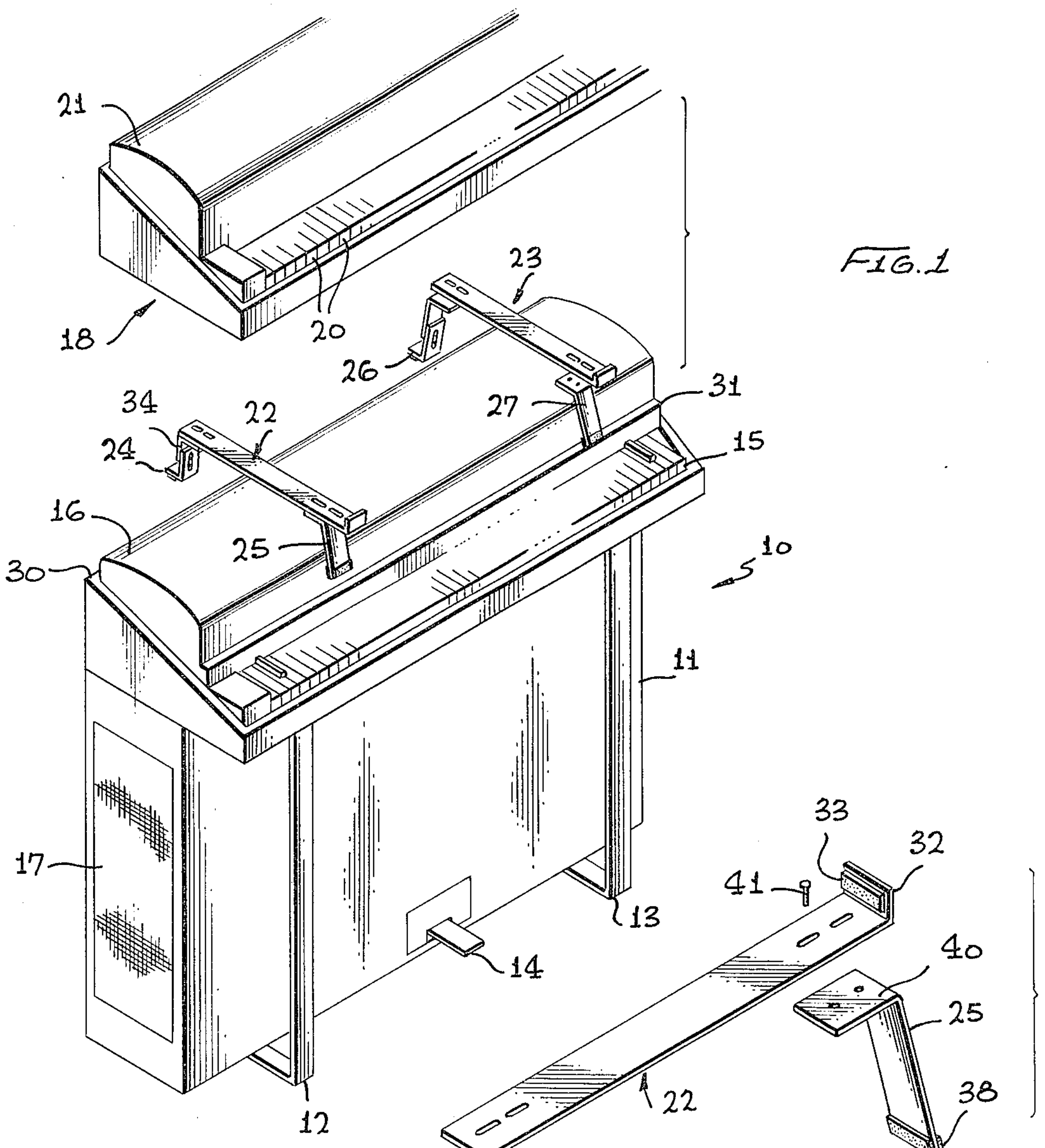
FIG. 1
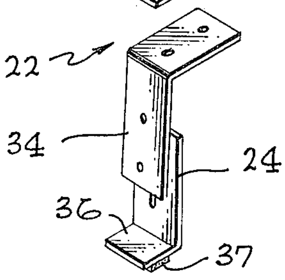
FIG. 3
FIG. 2
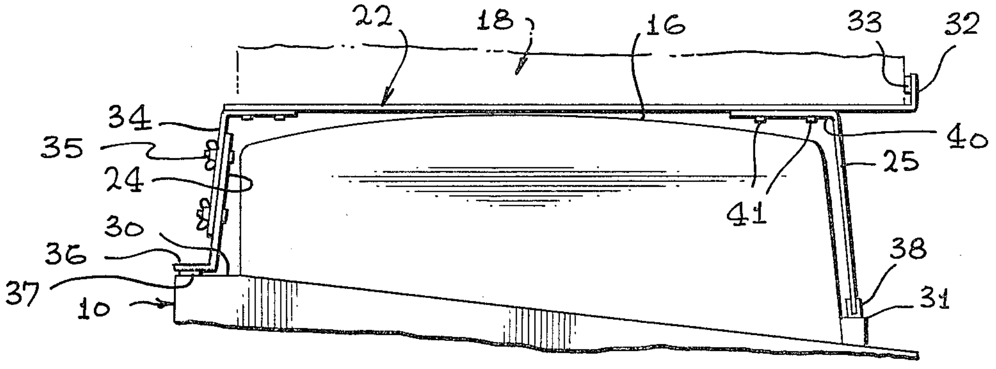

INSTRUMENT MOUNTING RACK

BACKGROUND OF THE INVENTION

1. Field of the Invention

This invention relates to mounting racks and more particularly to a novel rack for supporting equipment on the top of a conventional piano and which includes adjustments for tilt and overhang of the mounted equipment with respect to the piano and the player.

2. Brief Description of the Prior Art

In the music industry today, additional keyboards or equipment is required in close proximity and in convenient location with respect to the performer. For example, in the field of pianos, additional keyboards and/or amplifiers or music racks are desirably to be located on the top of the piano so that the performer can readily reach the equipment during the performance.

Difficulties and problems are encountered when employing conventional pianos because of the inherent design wherein the design includes a top portion which is of a rounded configuration and usually made of a rather thin plastic material. A heavy second keyboard or musical device when placed on the top of the piano portion has a tendency to deform the plastic top and cause permanent damage. Also, the rounded plastic top presents a very unstable surface for a second keyboard or other equipment, especially when the keyboard is placed in a comfortable playing position with respect to the performer.

Furthermore, another problem exists due to the induction of hum or other spurious noises when a second keyboard is placed on the plastic top of the conventional rounded top piano. The undesired noise is directly related to the proximity and mounting means by which the second keyboard or other equipment is carried on the rounded top.

Therefore, a long standing need has existed to provide a novel mounting means for carrying suitable keyboard or other musical equipment on the top of a conventional rounded piano which may be readily adjusted for tilt and overhang to provide convenient reach and utilization by a performer.

SUMMARY OF THE INVENTION

Accordingly, the above problems and difficulties are obviated by the present invention which provides a novel mounting rack for supporting a variety of equipment on the top of a conventional round top piano. The mounting rack includes at least a pair of elongated support members having downwardly depending leg portions adjustably carried on the opposite ends of each support member. Fastening means are employed for releasably connecting the leg portions to the selected ends of the support members whereby proper tilt and overhang adjustments can be made with respect to the mounted equipment to the keyboard of the piano. Means are provided for engaging with preformed shoulders and ledges of the round top piano while cushion means are provided for engaging with the mounted equipment as well as the mounting rack with respect to the piano surfaces.

Therefore, it is among the primary objects of the present invention to provide a novel mounting rack for equipment intended to be carried on the top of a round top piano which will provide for equipment tilt and overhang with respect to the keyboard of the piano.

Another object of the present invention is to provide a novel accessory or equipment mounting rack suitable for mounting equipment over a conventional round top piano wherein the equipment is within ready reach of the performer.

Still another object of the present invention is to provide a novel mounting rack for equipment which is relatively inexpensive and which may be readily installed without the necessity of skilled knowledge or procedures.

Still a further object of the present invention is to provide a novel mounting rack for carrying equipment above and in space relationship with respect to the rounded top of a piano wherein spurious noises from the equipment being carried does not substantially interfere with the operation of the piano on which it is mounted.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a front perspective view of a convventional piano having a rounded top employing the novel mounting rack of the present invention for mounting a second keyboard onto the piano top;

FIG. 2 is an enlarged, fragmentary view shown in side-elevation of the novel mounting rack of the present invention employed for mounting the second keyboard onto the rounded top of the piano as shown in FIG. 1; and FIG. 3 is an exploded view of one of the rack mounting means of the present invention illustrating the simplicity of adjustment and assembly thereof.

DESCRIPTION OF THE PREFERRED EMBODIMENT

Referring to FIG. 1, a conventional piano is illustrated in the general direction of arrow 10 which includes a main cabinet 11 having leg supports 12 and 13 as well as a foot pedal 14. The upper portion of the cabinet 11 includes a primary keyboard 15 and a rounded top portion 16. Normally, a variety of electronic components are mounted within the rounded top portion 16 and are operably connected between the individual keys of the keyboard 15 and a loudspeaker mounted in the cabinet 11 behind a grill 17. Therefore, when a performer depresses the individual keys of the keyboard 15, music will be propagated from the loudspeakers via the grill 17. A similar loudspeaker arrangement is included on the opposite end of the piano cabinet 11 from the end indicated by numeral 17.

In order to expand the talents of the performer as well as to provide additional sounds and muscial combinations not gained through the employment of a single keyboard such as the primary keyboard 15, a second keyboard is provided which is indicated in the general direction of arrow 18. The secondary keyboard includes a plurality of keys 20 and includes a top portion 21 similar to the portion 16 of the conventional piano. In mounting the second or additional keyboard 18 onto the conventional piano 10, provision must be made for proper tilt and overhang so that the keyboard 20 will be within the ready reach of the performer. Also, it is a requirement that the noise component of the second keyboard be maintained at a minimum distance from the electronic components within the rounded top 16 so that distortion will be minimized.

The mounting rack means of the present invention provides a means for supporting a second keyboard 18 onto the rounded top of the piano 10. The rack means includes a pair of elongated support members 22 and 23 which are identical in length and configuration. Each of the support members includes a pair of leg portions indicated by numerals 24 and 25 with respect to support member 22 and leg portions 26 and 27 with respect to support member 23. The support member 22 and 23 are arranged in fixed spaced apart relationship so that they will properly balance and support the weight and size of the second keyboard 18. Each of the leg portions include an engagement portion suitable for engaging with a contoured ledge or shoulder portion on the rounded top portion 16 of the piano 10. The rear ledge or shoulder is indicated by numeral 30 while the forward ledge is indicated by numeral 31.

As illustrated in FIG. 2, the elongated support member 22 includes a top surface which mounts the equipment such as second keyboard 18. A selected end, preferably the forward or front end of the support member, is provided with a raised element 32 having a cushion material 33 for engaging with the edge marginal region of the equipment or keyboard 18 so as to keep the equipment on the rack. The opposite end of the support member is provided with a downwardly and angularly disposed element 34 which supports a leg portion 24. The leg portion 24 is attached to the element 34 by a pair of wing nut fasteners such as fastener 35. The fasteners 35 are passed through holes in the element 34 and then through elongated slots in the leg portion 24 so that the equipment 18 may be tilted by slightly expanding or separating the element 34 with respect to the leg portion 24 and then tightening on the fasteners. The lower end of the leg portion 24 includes a foot 36 on which is mounted a cushion engagable with the shoulder or ledge 30 formed in the piano cabinet 11.

The opposite end of the support member 22 is supported at the front of the piano on the ledge 31 by the leg portion 25 which includes a cushion 38 engagable with the ledge 31. The opposite end of the leg member or leg portion 25 includes a right-angled element 40 that is suitably attached to the support member 22 by bolt and nut fasteners 41 which pass through slots in the member 22 and registered holes in the element 40 of the leg portion 25. In this manner, the leg portion 25 may be moved along the longitudinal axis of the support member 22 for adjusting overhang of the equipment or additional keyboard 18 with respect to the rounded top portion 16 of the piano 10.

Additional longitudinal adjustment may be gained by adjusting the fasteners which secure the element 34 to the extreme end of the support member 22. Such an arrangement is more clearly shown in FIG. 3 wherein the leg portion 25 may be moved longitudinally with respect to member 22 and the element 34 may also be moved. In this manner, overhang with respect to the rear or the front of the piano top portion 16 may be achieved.

In view of the foregoing, it can be seen that any suitable equipment may be readily mounted above the keyboard 15 by means of the subject invention. The inventive concept includes a pair of support members which are arranged in fixed spaced apart relationship with respect to each other and which include front and rear leg portions which cooperate together to stabilize the configuration and weight of the equipment mounted thereon such as the second keyboard 21. Tilt of the equipment may be readily achieved by positioning of the leg portion 24 through the fasteners 35. Overhang to the rear or in front may be achieved by adjusting the fasteners associated with the opposite ends of the support member 22 with respect to the associated slots.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A mounting rack apparatus for accessory equipment in combination with a piano having a rounded top separating a front and a rear integral ledge, the conbination comprising:
   - a pair of mounting racks supported on said front and rear ledges in fixed spaced apart relationship above said rounded top;
   - each of said racks includes an elongated support member having its opposite ends extending beyond the width of said rounded top and leg portions downwardly depending from the opposite ends to engage with said front and said rear ledges respectfully;
   - adjustment means operably interconnecting said leg portions to said support member for selecting desired tilt and overhang of the accessory equipment with respect to said rounded top;
   - cushion means carried on said leg portions interfacing between said leg portions and said ledges;
   - each of said leg portions includes a main base element and an angled foot depending therefrom;
   - said angled foot terminating with said cushion means;
   - said adjustment means includes elongated slots formed in the opposite ends of said support members and holes formed in said base elements;
   - releasable fastener means in registry with said slots and holes associated each end of said support members;
   - each of said support members includes an upright flange at a selected terminating end; and
   - said support members have a front end and a rear end;
   - said rear end carrying at least two leg portions so as to provide height adjustment by relative positioning of said two leg portions via said releasable fasteners.

2. An instrument mounting rack for supporting an accessory musical instrument on top ofa primary musical instrument, the combination comprising:
   - a pair of accessory musical instrument support pieces;
   - L-shaped leg members downwardly depending from each end of each support piece;
   - fastener means detachably connecting each leg member to its respective end of said support piece;
     - cushion means carried on the terminating end of each L-shaped leg member engagable with the external surface of the primary musical instrument;
   - an intermediate leg member adjustably interposed between a selected one of said L-shaped leg members and said support piece;

an upwardly projecting lip carried on the end of said support pieces opposite to their ends carrying said intermediate leg member; and said support pieces are disposed in fixed spaced apart relationship to hold the accessory musical instrument above the primary musical instrument.

3. The invention as defined in claim 2 wherein:

said L-shaped member associated with said intermediate leg member includes an outwardly projecting foot for resting on the primary musical instrument.

* * * * *